(12) United States Patent
Yeager

(10) Patent No.: US 9,039,547 B2
(45) Date of Patent: May 26, 2015

(54) PERSONAL SPORTS SIMULATION ROBOT

(71) Applicant: Michael Yeager, Newton Center, MA (US)

(72) Inventor: Michael Yeager, Newton Center, MA (US)

(*) Notice: Subject to any disclaimer, the term of this patent is extended or adjusted under 35 U.S.C. 154(b) by 151 days.

(21) Appl. No.: 13/958,306

(22) Filed: Aug. 2, 2013

(65) Prior Publication Data

US 2014/0038751 A1 Feb. 6, 2014

Related U.S. Application Data

(60) Provisional application No. 61/679,644, filed on Aug. 3, 2012.

(51) Int. Cl.
| | |
|---|---|
| *A63B 69/00* | (2006.01) |
| *A63B 47/00* | (2006.01) |
| *A63B 69/38* | (2006.01) |
| *A63B 69/40* | (2006.01) |
| *A63B 71/06* | (2006.01) |
| *A63B 24/00* | (2006.01) |
| *A63B 47/02* | (2006.01) |
| *A63B 71/02* | (2006.01) |

(52) U.S. Cl.
CPC ............ *A63B 47/002* (2013.01); *A63B 69/38* (2013.01); *A63B 69/40* (2013.01); *A63B 69/406* (2013.01); *A63B 71/0605* (2013.01); *A63B 71/0669* (2013.01); *A63B 24/0062* (2013.01); *A63B 24/0075* (2013.01); *A63B 47/02* (2013.01); *A63B 47/021* (2013.01); *A63B 2024/0034* (2013.01); *A63B 2024/0068* (2013.01); *A63B 2047/022* (2013.01); *A63B 2069/401* (2013.01); *A63B 2071/025* (2013.01); *A63B 2071/0611* (2013.01); *A63B 2071/063* (2013.01); *A63B 2210/50* (2013.01); *A63B 2220/13* (2013.01); *A63B 2220/16* (2013.01); *A63B 2220/30* (2013.01); *A63B 2220/36* (2013.01); *A63B 2220/40* (2013.01); *A63B 2220/51* (2013.01); *A63B 2220/806* (2013.01); *A63B 2220/808* (2013.01); *A63B 2225/50* (2013.01)

(58) Field of Classification Search
CPC ........... A63B 69/406; A63B 2069/402; A63B 2069/0008; A63B 69/002
USPC ......... 473/422, 431, 438, 451; 124/78, 45, 48
See application file for complete search history.

(56) References Cited

U.S. PATENT DOCUMENTS

| | | | | |
|---|---|---|---|---|
| 4,077,533 | A * | 3/1978 | Meyer | 414/440 |
| 6,386,607 | B1 * | 5/2002 | Deininger | 473/132 |
| 2006/0082171 | A1 * | 4/2006 | Olmstead | 294/19.2 |
| 2007/0078018 | A1 * | 4/2007 | Kellogg et al. | 473/151 |

* cited by examiner

*Primary Examiner* — Mitra Aryanpour
(74) *Attorney, Agent, or Firm* — Tran & Associates

(57) ABSTRACT

A sports simulation robot for playing games and drills on a standard court or field during which the robot will simulate the competitive play of a human opponent with specific playing characteristics such as strategy, physicality, playing style and skill level. The robot is small enough and light enough to be easily stored, transported and deployed; has a ball storage device for retrieving, storing and dispensing the balls; can reload the balls into the ball storage device by catching them or by autonomously reloading them; has a ball firing system that is compact, lightweight and efficient, that can generate the shot dynamics that the corresponding human opponent would be capable of generating; has a drive system that makes it capable of moving around the court at speeds that are comparable to the speed of the human opponent that is being simulated; has the ability to call shots In or Out, keep the score, provide coaching, and keeps a record over time of the player's performance against different categories of simulated opponents.

16 Claims, 14 Drawing Sheets

PERSONAL SPORTS SIMULATION ROBOT

RELATED APPLICATIONS

This Application claims the benefit of priority of U.S. Provisional Application No. 61/679,644, filed on Aug. 3, 2012, the entire contents of which application(s) are incorporated herein by reference.

BACKGROUND OF THE INVENTION

1. Field of the Invention

The present invention relates to the technical field of sports training systems and more particularly to sports simulation robots and more especially but not exclusively it relates to the use of sports simulation robots for the individualized training of players competing in ball and puck playing sports.

More particularly the present invention relates to a personal sports simulation robot that provides training and practice for a player by physically simulating a human opponent with specific playing characteristics: playing strategy, player physicality, playing style, and skill level; in order to develop the player's ability to compete with and potentially win against a corresponding human opponent. This sports simulation robot is designed to simulate the playing characteristics of a corresponding human opponent on any standard court or field for the sport being played; is able to move around the court or field with the speed and agility of the corresponding human opponent; and can fire game balls to precise locations on the court or field with the same flight dynamics, such as spin, trajectory and velocity, that a human opponent having the corresponding playing characteristics—playing strategy, player physicality, playing style and skill level can achieve.

In addition, this sports simulation robot: provides a ball storage device that can be used for retrieving and dispensing the game balls; can be reloaded efficiently by the player, reloaded automatically by catching the returned balls during the playing of each game or drill, or reloaded autonomously by the robot without the player's assistance; has embodiments that are smaller in size and weight compared to other such systems to the point that the personal sports simulation robot can be kept at home by an individual player and easily transported to and from a standard field or court by the player; is controlled through keypad, touch, gesture, or voice commands; provides coaching and scoring reports to the player during the course of each simulation session; and maintains and communicates data on the player's improvement over multiple simulation sessions.

2. Description of Related Art

With the ever increasing level of play in athletic competitions there is an equally growing demand for sophisticated training techniques that can prepare a player for opponents who use different strategies, are physically different (tall, short, slow, fast, right handed, left handed), have different playing styles and different skill levels. Traditionally training has been carried out by coaches and trainers who use drills and practice games to imitate game playing situations and conditions. As the need for training becomes ubiquitous, the benefit of the repetitious practice of winning playing styles, strategies and techniques has become clear and is now required by players throughout their amateur and professional careers. The cost for a player to hire a coach or instructor on a weekly or daily basis is prohibitive for all but the most successful players. Athletes who are working hard to improve their level of play have a need for an automated, easy to use, sports simulation robot that can perform this same service for them at a lower cost and with greater convenience.

Many methods, systems and devices have been previously proposed for sports training. In particular, for ball playing sports, ball throwing machines that are designed for throwing baseballs, footballs, pucks or tennis balls are well known. Prior art of one such tennis ball throwing machine is disclosed by Scott in U.S. Pat. No. 4,086,903.

The ball throwing mechanism described in this patent uses one or two electric motor(s) that are geared or use a chain or belt drive to continuously spin a pair of wheels. Each tennis ball passes between these two wheels to be subsequently launched from one end of the tennis court to the other. The gearing, chain or belt and the associated mechanism that is used to spin these two wheels is such that the rotational speed of the two wheels can be varied in order to impart topspin or backspin on the ball. In most embodiments, the entire mechanism can also be rotated to render the spin in planes other than the vertical plane. Likewise these ball launching mechanisms can be turned and elevated to change the direction and angle that each ball is launched, and the timing between the launching of balls can be varied.

A drawback of these ball throwing machines is that the motors combined with gearing, chains or belts form a unified system of substantial size and weight—making it more difficult for a single player to store these systems at their home, and transport them to and from the playing field or court. Another drawback of these ball throwing machines is that the motor, gears and wheels are designed to spin continuously, and therefore consume electricity during the time between the launching of balls. Further, the design of the ball launching mechanism limits the range of the possible directions, velocities and spins that can be given to each ball, and none of the systems currently available is able to move autonomously around the court as an opponent would, nor are they able to catch the balls as they are returned, nor are they able to reload the balls autonomously, nor are they able to communicate training instructions or provide long term feedback to the player on their performance against particular playing styles or strategies.

Salansky (U.S. Pat. No. 5,490,493) proposes a system of two or more ball throwing machines that are positioned at different locations on the court. These multiple machines then coordinate the throwing of balls such as to more closely simulate the way a human player would return balls from different parts of the court.

A drawback of this ball throwing machine arrangement is that the use of multiple machines increases the size and complexity of the system, making it unsuitable as a personal training solution. An additional drawback is that a very large number of stationary machines would have to be deployed in order to fully replicate all the locations on the court that a normal human player might use. An additional drawback of both the Scott and Salansky designs is that these ball throwing machines lack any integrated ball retrieving, catching or gathering device and therefore require a large reservoir of balls. The size and weight of a large reservoir of balls and a separate ball retrieving device expands the size and weight of the overall system to the point that it is impractical as a personal training solution.

Eddy (U.S. Pat. No. 5,755,632) details a simple ball retrieval, storage and ball dispensing system consisting of a tube with a flange on the bottom that is slightly smaller than the size of the ball. The user then presses the tube and flange down over the ball to be retrieved, and the ball is pushed past the flange and retained in the tube. An elastic band on the top of the tube keeps the balls inside the tube until they are ready to be dispensed. This system is widely used by tennis coaches today for faster and more efficient retrieval of tennis balls during tennis coaching sessions—including those coaching sessions that use ball throwing machines.

A drawback of this ball retrieval, storage and dispensing system is that it is not integrated with a ball machine and therefore has to be maintained as an additional device that increases the bulk and size of the equipment required. A second drawback is that this device is the shape of a cylinder with balls stacked on top of each other. This limits the number of balls that can be stored in the system before it becomes too long to be easily transported and stored. An additional drawback of this system is that to load a new ball, the user must apply the force required to lift all of the balls that are already stacked in the tube. Therefore the number of balls that it can store is limited by the strength of the user.

Meyer (U.S. Pat. No. 4,077,533) details a larger scale ball retrieval and storage system. This system consists of a large bin mounted on top of a pair of wheels with a rotor that spans the space between these wheels. As the bin is pulled by the wheels over the balls scattered around the court, the rotor conveys the balls upward and into the bin. Once the bin is full, the unit can be stood upright so that a tennis coach can extract the balls for use in running drills with the training player.

A drawback of this ball retrieval and dispensing system is that while it can be used in conjunction with a ball throwing machine, there is no specific way that this system can be integrated with a ball throwing machine. This means that it must exist as a separate system from the sports training system, and this increases the size and weight of those systems that must be stored, transported and deployed by the user, making this design unsuitable as part of a personal sports training system.

Bear (U.S. Pat. No. 4,915,384) details a sports training system for baseball, tennis and other sports that simulates the playing of a game, and accommodates its performance to a player's current level of skill, and can increase the level of the challenge presented in order to train the player towards peak performance.

A drawback of the design of this system, like the design of other prior art of this type, is that the system requires the use of a dedicated environment to accommodate the multipart and specialized equipment that makes up this sports training system. It is impractical therefore for this system to be transported and used on a standard field or court making it unsuitable for use as a personal sports training system.

Ungari (U.S. Pat. No. 2008/0269017) details an adaptive sports training system that utilizes a mobile robot that is equipped with an optical information system. This system, amongst other things, determines the location of the player being trained and positions itself in relationship to the player depending upon the goals of the training session.

A drawback of this design is that it is intended for the monitoring and conditioning of the player, and is not designed or intended to have any of the capabilities of the preferred embodiment of the present invention around the simulation of competitions with a physical opponent on a standard court or field.

Ilon (U.S. Pat. Nos. 4,598,782 and 3,876,255) details a design for an omnidirectional drive system. This system provides omnidirectional motion for a vehicle in any planar direction. The ability of this and similar systems to move left or right, forward or back, without changing the direction that the vehicle is pointed, is a capability that a personal sports simulation robot requires. Like a tennis player playing with the modern open stance style, the personal sports simulation robot needs to move around the court while always being pointed towards the player's end of the court.

A drawback of the Ilon design, and holonomic drive systems in general, is the loss of efficiency entailed in moving a vehicle in a direction that is not the same as the rotational direction of the drive motors. A personal device where the preferred embodiment is a battery operated system is better served by a drive system that does not translate the drive motor's power into a direction of motion that is significantly different from the rotational direction of the drive motors since it is more efficient to propel the vehicle in the same direction that the drive motors are rotating.

Another drawback of a holonomic drive system is the substantial difference between the velocity and acceleration for side to side versus forward and backward motion. This is unlike a human opponent who can more equally move side to side, and forward and back.

Another drawback of this design is the force that a holonomic drive system applies to the surface it is running on. Mecanum wheels in particular apply a significant angular force to the surface in order to achieve omnidirectional movement. The surface that the vehicle is traveling on is directly impacted by this force. This characteristic makes it difficult for a holonomic system to function on soft surfaces such as that of a clay tennis court without disturbing the soft surface of the tennis court. The holonomic drive system when driven at player simulation speeds also poses a potential danger to a hard court surface and therefore is less likely to be allowed for use on such courts. A system that uses soft foam or soft rubber conventional wheels to achieve omnidirectional motion is better able to perform efficiently on soft surfaces such as a clay tennis court without disturbing the surface. A system using conventional wheels also has a lower risk of damaging a hard court surface and is therefore more likely to be approved for use on such courts.

Sherry (International Pub. No. WO 01/41884) details a video ball tracking system for tracking balls in ball playing sports. This tracking system consists of a minimum of 4 video cameras installed at specific locations surrounding the court (the embodiment as described uses 6 video cameras) in combination with a central processing system that combines and processes the video data from the video cameras. This system plots and predicts each balls position, direction and velocity as it travels around the field or court. In the case of the game of tennis, this system is used to call balls In or Out whenever the calls by the empires are challenged by the players.

A drawback of this design that makes it less useful as part of a personal sports training system are its requirements for: four or more video cameras installed surrounding the court; substantial computing power to process the input from the four or more video cameras; and one or more full-time operators for the system. While this type of ball tracking system may be necessary to accurately determine the path of a ball for professional tournaments, by definition a personal sports simulation robot requires a solution that is: not installed as a part of the court infrastructure; that is compact and easily transported; does not require any operators; does not require any setup beyond the deployment of the sports training system itself; and uses a calculation scheme that can be handled by a processing system that is appropriate for a personal battery powered device.

The prior art has many shortcomings as discussed above. There is a need in the art for a personal sports simulation robot. Such a system is personal to the player such that it is small enough and portable enough to be: easily stored at the player's residence; transported by a single player in a normal sized vehicle or on an airline flight in one or more normal sized pieces of luggage. Such a system is self-contained and will configure itself automatically for competing with the player on any standard field or court. Such a system will keep a game playing record for each player and make available to each player a set of training drills and opponent profiles that will challenge the player at their current skill level. It will be capable of launching balls from any location on the robot's side of the court or field, to any location on the player's side of the court or field with the same ball flight dynamics, such as velocity, trajectory and spin that a human competitor of that particular skill level and playing style would be capable of. It will move around the field or court to locations that a human opponent would travel to and with comparable speed and agility to that which a human opponent is capable of. It will communicate with the player, taking directions from the player such as which game or drill to run, and when to start and stop; and provide coaching and instruction to the player such as how to properly complete each simulation.

Such a system will track the game ball or other game pieces, track the success or failure of the player's shots, keep a running score for each game, communicate this score to the player, and maintain an historical score of each player's playing performance against a variety of simulated opponents over time.

SUMMARY OF THE INVENTION

One object of the present invention is to provide a personal sports simulation robot that is able to simulate the competitive play of a human opponent with particular playing characteristics such as a particular playing strategy, a particular physicality, a particular playing style, and a particular skill level throughout the course of a simulated game or drill.

Another object of the present invention is to be able to produce embodiments of a personal sports simulation robot that are small enough and light enough to be easily stored, transported and deployed on the playing field or court by an unassisted player.

Another object of the present invention is to incorporate a ball storage device for retrieving, storing and dispensing the game balls. This ball storage device is to be detachably mounted on the robot such that the player can carry the device around the court to retrieve the game balls, making the collection of game balls faster and more efficient, while keeping the number of game balls that need to be stored and transported to a minimum.

Another object of the present invention is the capability to load the game balls into the ball storage device either manually by the player carrying the ball storage device around the court or field; by catching the balls as they are returned by the player; or by autonomously reloading the game balls by sweeping the game balls off the court or field and back into the ball storage device.

Another object of the present invention is to incorporate a ball firing system that is compact, lightweight and efficient, and that can generate the shot dynamics such as velocity, trajectory and spin that is comparable to the shot dynamics that the corresponding human opponent would be capable of imparting to the ball.

Another object of the present invention is the capability to move around the court at speeds that are comparable to the speed of the human opponent that is being simulated while posing little risk of damage to the surface of the court or field and little risk or danger to players or bystanders.

Another object of the present invention is to incorporate a line calling system that makes a best determination of whether the player's shots land In or Out, and is capable of maintaining and reporting the ongoing score for the player during the playing of each simulated game or drill.

Another object of the present invention is a player interactive system that allows the player to control the robot using a keypad, touch, gesture or voice commands, and to hear coaching messages on playing strategy and technique during the playing of each simulated game or drill.

Another object of the present invention is the capability to track the player's playing record over time and provide the player with reports on the player's performance against different categories of simulated opponents.

A preferred embodiment of the sports simulation robot is for simulating tennis games and drills and comprises: a platform for securing the robot components; a battery system for powering the robot systems; a computation system for running the robot services; a player interactive system for the player to input the game or drill to be simulated and the playing strategy, player physicality, playing style and skill level of the opponent being simulated, and for the robot to report the score, coaching and progress information to the player; a navigation service that determines the position, velocity, acceleration and azimuth angle of the robot in relation to the court during the playing of a simulation; a drive system capable of moving the robot around the court at speeds that are comparable to that of the human player being simulated; a ball storage device that contains the balls to be used during the playing of a simulation that can be detached from the robot and used by the player for retrieving and dispensing the game balls; a ball firing system that is capable of firing each game ball from any location on the robots side of the court to any specific location on the player's side of the court with the velocity and spin that is appropriate for the corresponding player being simulated; a ball following service that provides flight path information of the ball after being fired by the robot and returned by the player; a catching apparatus that uses the flight path data from the ball following service to drive the robot into position to catch the returned ball and retain it in the ball storage device; an autonomous reloading mode where the robot will drive around the court reloading the balls back into the ball storage device; a line calling service which makes a best determination of whether each ball returned by the player has landed IN or OUT of the court; a score reporting service that maintains the game score during the playing of a simulation; a coaching and progress reporting service that will provide strategic information to the player during the playing of a simulation, and maintains an historical record over time against a plurality of simulated opponents having different playing characteristics such as strategy, physicality, playing style, and skill level.

DETAILED DESCRIPTION OF A PREFERRED EMBODIMENT

One embodiment of the personal sports simulation robot, but not the exclusive embodiment, is for running simulations of tennis games and drills. It should be noted that the present invention can be adapted to a variety of sports such as baseball, basketball, volleyball, football, soccer, lacrosse, hockey, racquetball, squash, badminton and ping pong.

This preferred embodiment of the present invention has the capability of moving autonomously around the tennis court to simulate the way that a human opponent, with a particular set of playing characteristics such as a particular strategy, a particular physicality, at a particular skill level, and using a particular playing style, would move around the court during the course of a game or drill.

The movement capability of this preferred embodiment is also employed for autonomously reloading the game balls into the ball storage device after they have been hit and have come to rest on the field or court.

During the course of a simulated game or drill, the robot will move around the court and fire the game balls with shot dynamics (firing location, spin direction, velocity, height above the net, and impact location) that simulate the shot dynamics that a human opponent with a particular set of playing characteristics would be capable of imparting to the ball.

The shot dynamics for each ball that is fired within the playing of each point is sequenced to follow the overall strategy of the human opponent that is being simulated. Each ball that is fired has the shot dynamics based on the previous simulated shot and the player's return of that shot. The shot profile used to fire each ball is selected as the shot that would be played by that particular simulated opponent at that particular strategic situation in the game or drill.

Figure 1:
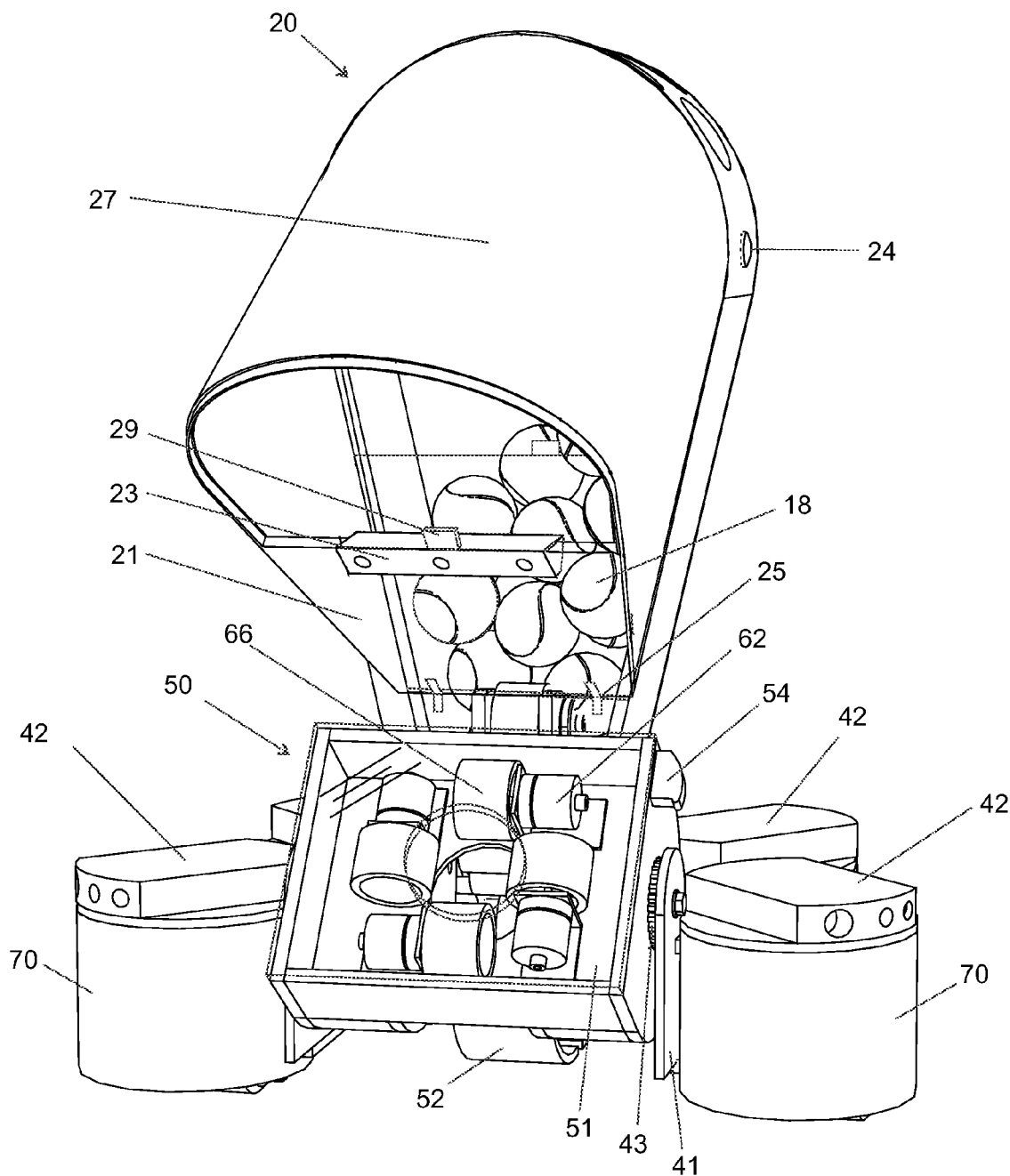
FIG. 1 is a front perspective view of one embodiment of the present invention showing the ball catching apparatus in the deployed position.
Figure 2:
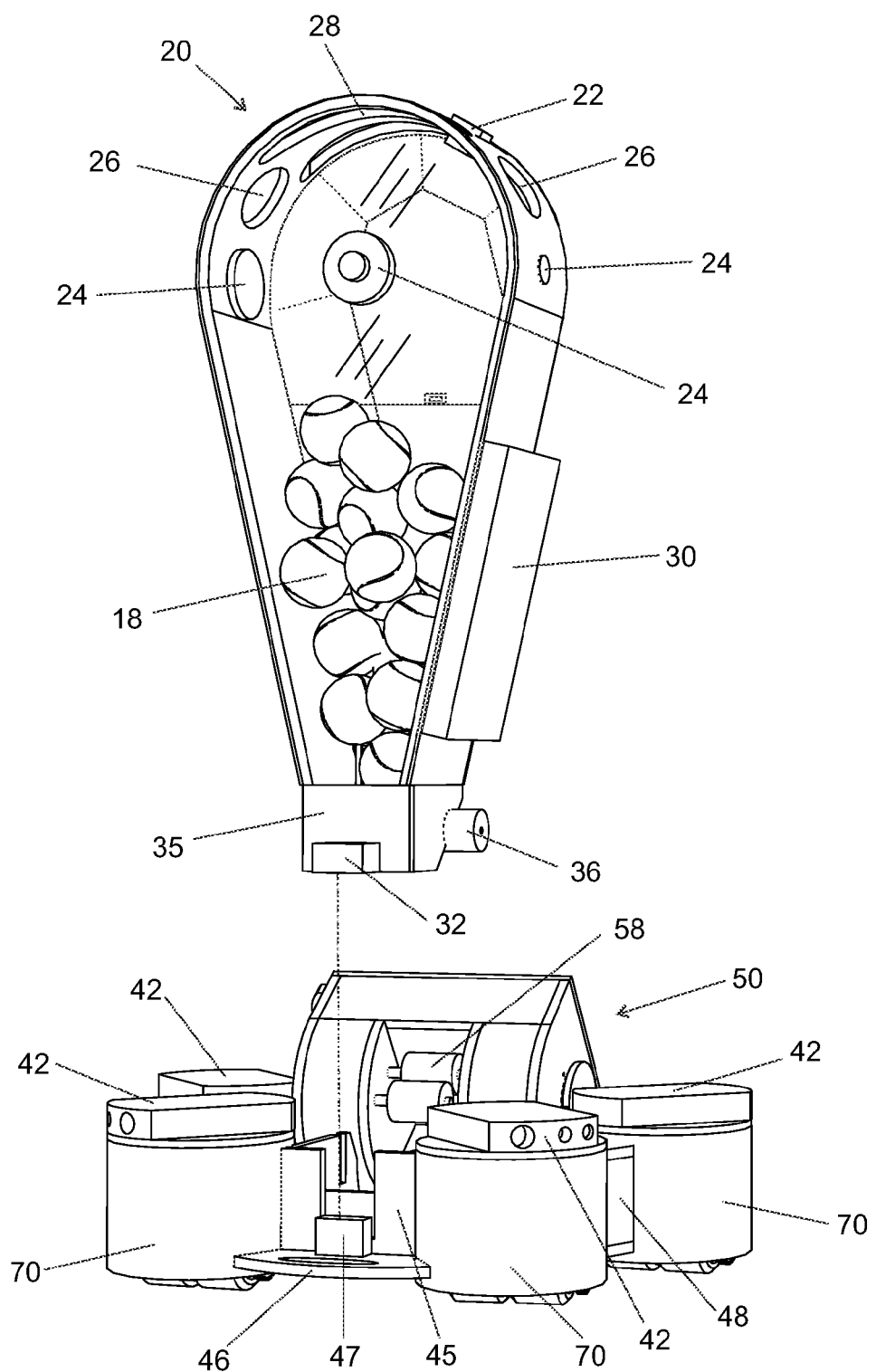
FIG. 2 is a rear perspective exploded view of one embodiment of the present invention showing the ball storage device separated from the platform.
Figure 3:
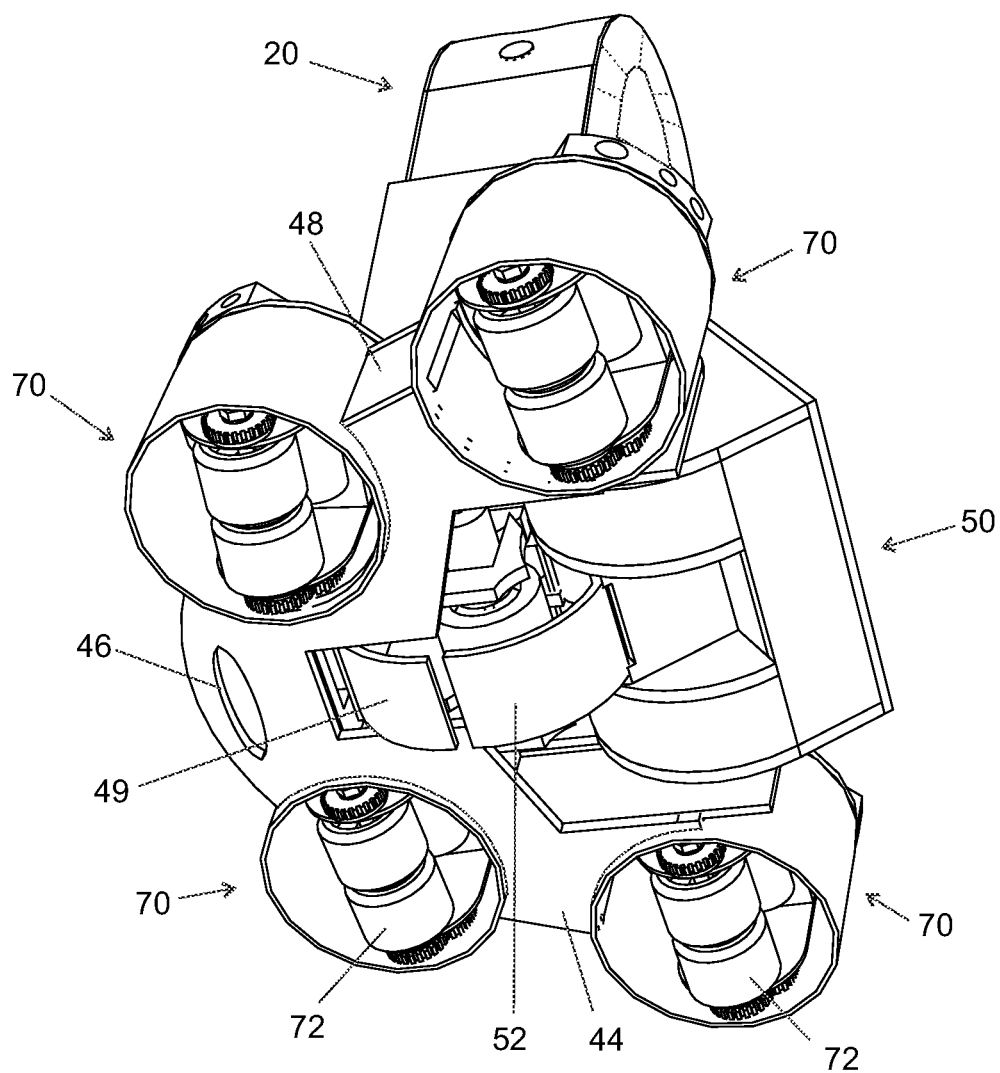
FIG. 3 is a bottom perspective view of one embodiment of the present invention showing the drive system with four omnidirectional drive units and their relationship to the ball firing system, and the ball storage device.
Figure 4:
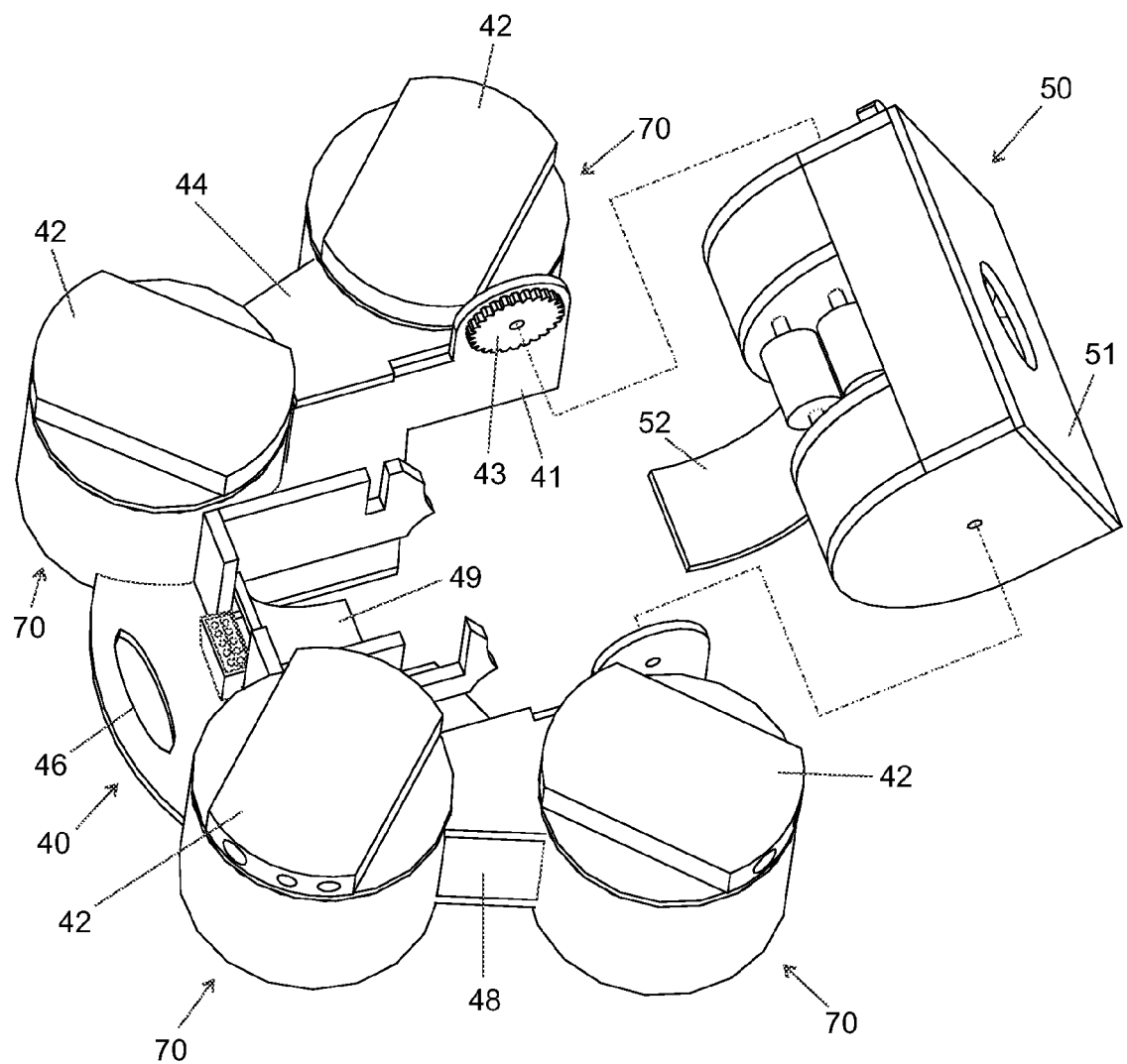
FIG. 4 is a top perspective exploded view of one embodiment of the present invention that does not include the ball storage device and shows the ball firing system detached from the platform.

FIGS. 1, 2, 3 and 4 show aspects of the preferred embodiment of the present invention, including, as indicated: the ball storage device 20 which is a container for holding a plurality of game balls and is used for retrieving, storing and dispensing the game balls; the ball storage device battery and electronics compartment 30; the firing head 50 which contains the motor ring 60 that is the primary component of the ball firing system; the individual omnidirectional drive units 70 that make up the drive system in the preferred embodiment; the navigation sensors 24 on the ball storage device 20 and navigation sensors 42 mounted on top of the omnidirectional drive units; and the ball following sensor system 23. FIGS. 3 and 4 also indicates the location of the battery compartment 44 that contains the battery system that provides power to the robot systems, and the location of the service compartment 48 that contains the computational system for running robot services including the simulation service, the navigation service, the ball following service, the score reporting service, and the coaching and progress reporting service.

One aspect of the preferred embodiment is that it does not have a bin or bucket for the balls. As shown in FIG. 2, the preferred embodiment of the present invention has a ball storage device 20 which is a container that can hold a plurality of game balls, and is used for gathering, retrieving, storing and dispensing the game balls.

The ball storage device is built as a single unit that snaps into and out of the storage device mount 45 on the platform. The player can unsnap the ball storage device from the storage device mount and use it to efficiently sweep up the balls from the court. After sweeping up the balls from the court, the player then snaps the ball storage device back into the storage device mount where the same sweeper wheel that is used for sweeping the balls from the court, is then used to feed the balls one by one out of the ball storage device and into the ball firing system.

FIG. 2 shows the ball storage device 20 separated from the storage device mount 45 and shows how the male electrical connector 32 on the ball storage device snaps into the corresponding female electrical connector 47 on the platform when the two are attached together. This electrical connection connects the electronics in the ball storage device to the ball firing system so that when the ball storage device is attached to the platform the ball firing service can control the sweeper gear motor 36, to dispense the balls one by one into the ball firing system. This electrical connection also transmits data from the ball following sensors 23 and the navigation sensors 24 located on the ball storage device.

Figure 7:
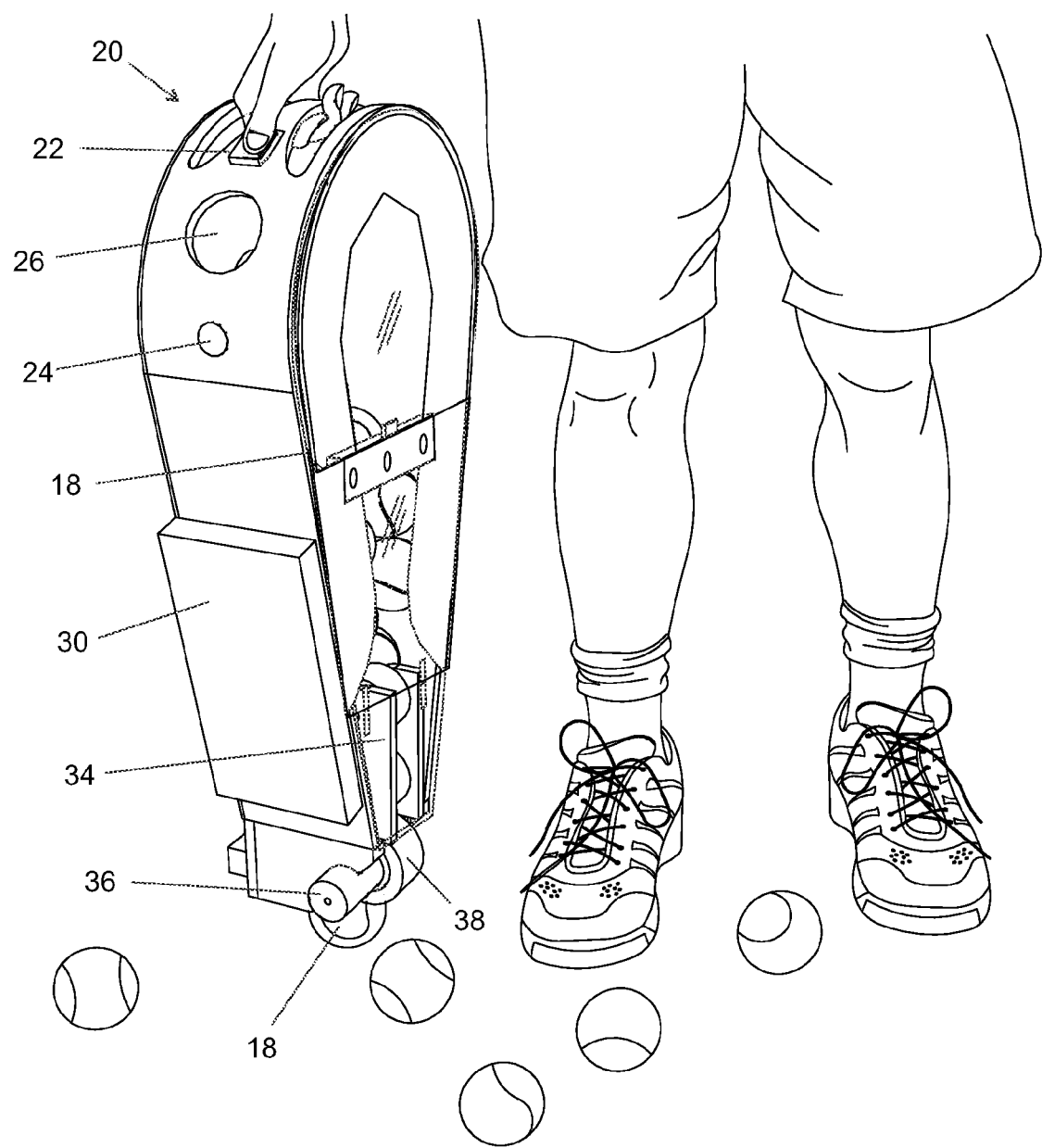
FIG. 7 is a perspective view of one embodiment of the ball storage device being used by a player to sweep tennis balls from a tennis court.

As shown in FIG. 7, the bottom end of the ball storage device has an opening or mouth that is slightly smaller than the size of a tennis ball and this opening has a single sweeper wheel 38 mounted on one side of this opening. The sweeper wheel is mounted on the sweeper gear motor 36. When not connected to the platform, the ball storage device is controlled by the rocker switch 22 located on the ball storage device handle 28. The rocker switch is connected to the battery and electronics located in the ball storage device battery and control compartment 30. With the rocker switch pushed to the load position, the sweeper gear motor spins such as to compress a game ball against the opposite side of the ball storage device mouth rolling it up into the ball storage device. When the rocker switch is pushed to the unload position, the sweeper gear motor spins in the opposite direction to roll a ball out of the ball storage device.

Figure 6:
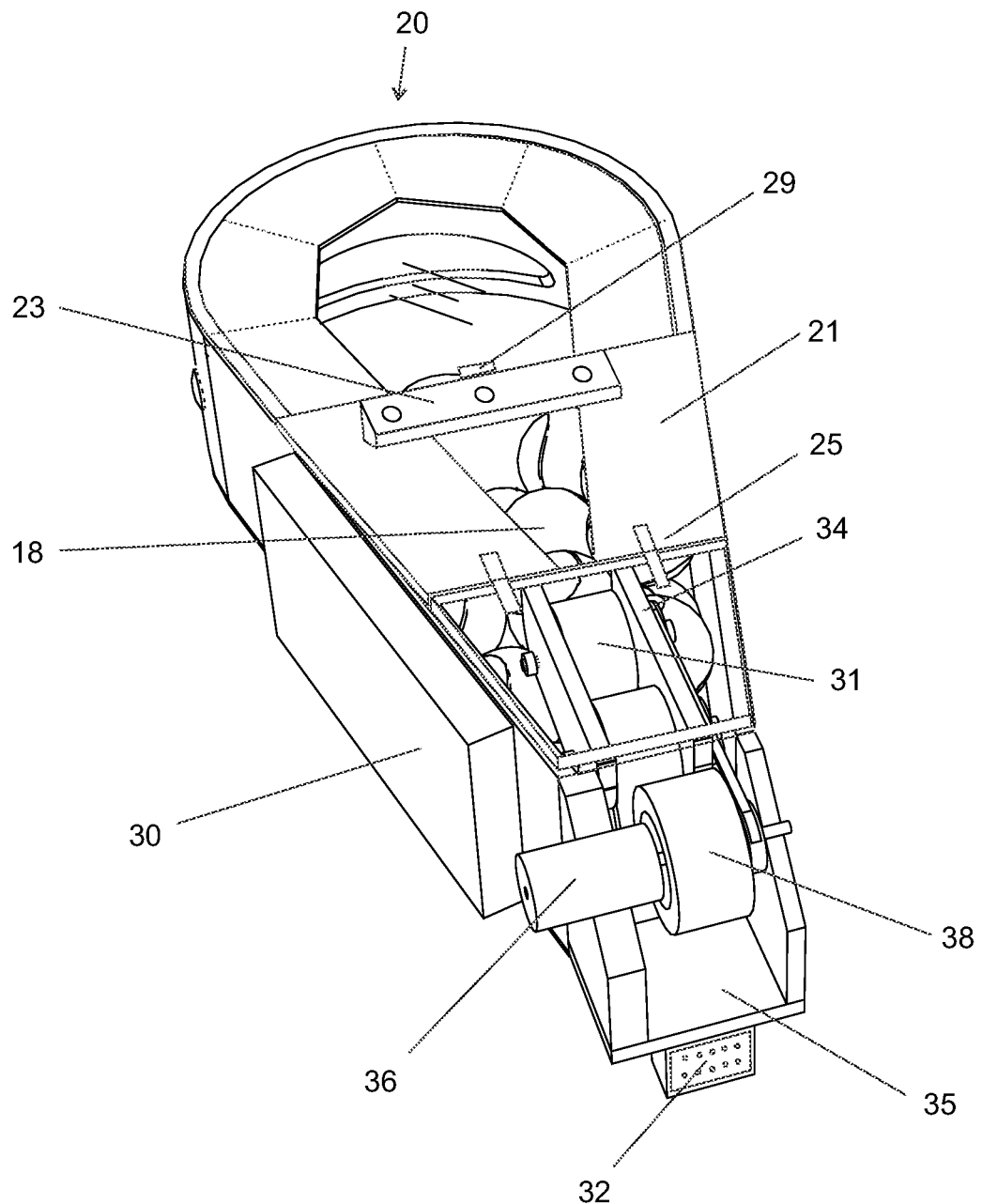
FIG. 6 is a perspective view of one embodiment of the ball storage device by itself.

As shown in FIG. 6, this embodiment of the ball storage device has two additional feeder wheels 31 further up inside the ball storage device that are driven through a belt from the sweeper gear motor. These feeder wheels move the game balls smoothly up into and out of the ball storage device by breaking up ball jams that occur at the point where the ball storage device is slightly less than two ball widths wide, which in this embodiment is approximately at the position of the uppermost feeder wheel.

As shown in FIG. 7, the player can manually reload the game balls into the ball storage device by lowering the ball storage device over each game ball 18 while pushing the rocker switch to the reload position. The sweeper wheel 38 then turns and rolls the game ball up through the mouth and into the ball storage device. The player then moves around the court, from game ball to game ball, sweeping each up into the ball storage device until all of the game balls have been collected in the ball storage device. The player can also, as needed, pickup game balls by hand and push them directly into the ball storage device through the holes 26 in the top of the ball storage device. These holes, like the mouth of the ball storage device, are slightly smaller than the size of the game ball, and due to this smaller size, the game balls are contained inside the ball storage device and do not come back out through these holes.

As shown in FIG. 6, both the face 33 of the ball storage device 20 is transparent. This makes it easier for the player to see the individual game balls being swept up into the ball storage device during reloading, and it allows the player to see the level of game balls that are left in the ball storage device during the playing of drills and games. If the player wishes to remove game balls from the ball storage device, the player presses the rocker switch to the unload position and the sweeper wheel and motor then spin in the opposite direction, and the game balls are rolled by the sweeper wheel 38 back out of the ball storage device one-by-one. When the ball storage device is connected to the platform, the ball firing service, running on the computational system located in the service compartment 48, operates the sweeper gear motor 36 spinning the sweeper wheel 38 to roll the game balls one by one out of the ball storage device and into the ball firing system.

As shown in FIG. 1, the ball catching apparatus is comprised of a frame 21 that is hinged 25 at the bottom to the front of the ball storage device. This frame has a lightweight fabric attached around its outer edges with the other edge of the fabric attached to front outer edge of the ball storage device. When the frame is unlatched and pulled forward away from the front of the ball storage device into the deployed position, this fabric folds out stretching into a fabric hood 27 for catching the game balls.

When the ball catching apparatus is in the deployed position, the opening at the top of the frame 21 faces slightly downward towards the court to enable the game balls to enter into the fabric hood. The ball following sensor system 23 can be seen in FIG. 1 at the bottom edge of this opening. The lower part of the frame below the ball following sensor system is transparent plastic, and forms a ramp that funnels the game balls back into the ball storage device after they have been caught in the fabric hood.

The ball following sensor system 23 tracks the flight of each game ball after it is fired and returned by the player. The ball flight data from this system is communicated to the simulation service which uses this data to provide activities to the drive system intended to position the robot in front of the oncoming game ball and behind the point where it impacts the court such that the game ball will bounce up and into the ball catching apparatus. Note that the personal sports simulation robot is not intended to try to catch all of the game balls that a player will hit, but only those game balls that have been returned "in play" within the lines of the court. Balls that are not caught during the course of play will be gathered the next time the robot goes into the autonomous reloading mode.

This particular embodiment of the ball catching apparatus is not articulated, but this does not preclude other embodiments where the ball catching apparatus is articulated to catch or trap the ball in a more agile fashion.

This particular embodiment of the present invention also does not catch and then fire the same game ball. Instead, it catches a returned game ball, and subsequently fires a game ball that has already been pre-loaded into the ball firing system. This does not preclude other embodiments of the personal sports simulation robot that are designed to catch and fire the same game ball.

Figure 5:
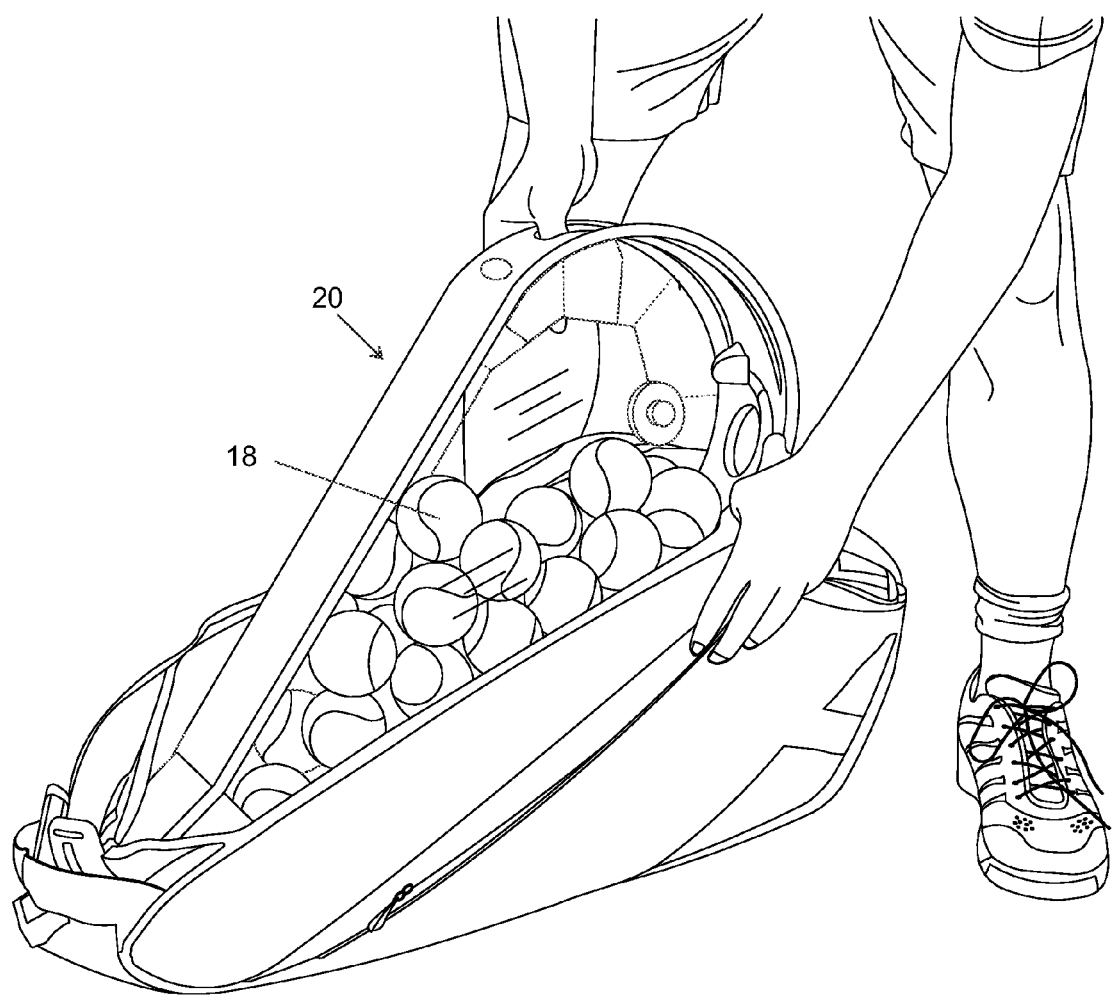
FIG. 5 is a perspective view of one embodiment of the ball storage device being stored in a standard size tennis bag.

FIG. 5 shows the ball storage device filled with game balls with the front door frame latched flush against the front of the ball storage device, and the ball catching apparatus folded inside the frame against the front of the ball storage device. In this configuration, this embodiment of the ball storage device fits easily into one side of a standard tennis bag for storage and transport. This does not preclude other embodiments of the present invention from having ball storage devices that are configured in other shapes and sizes.

Figure 8:
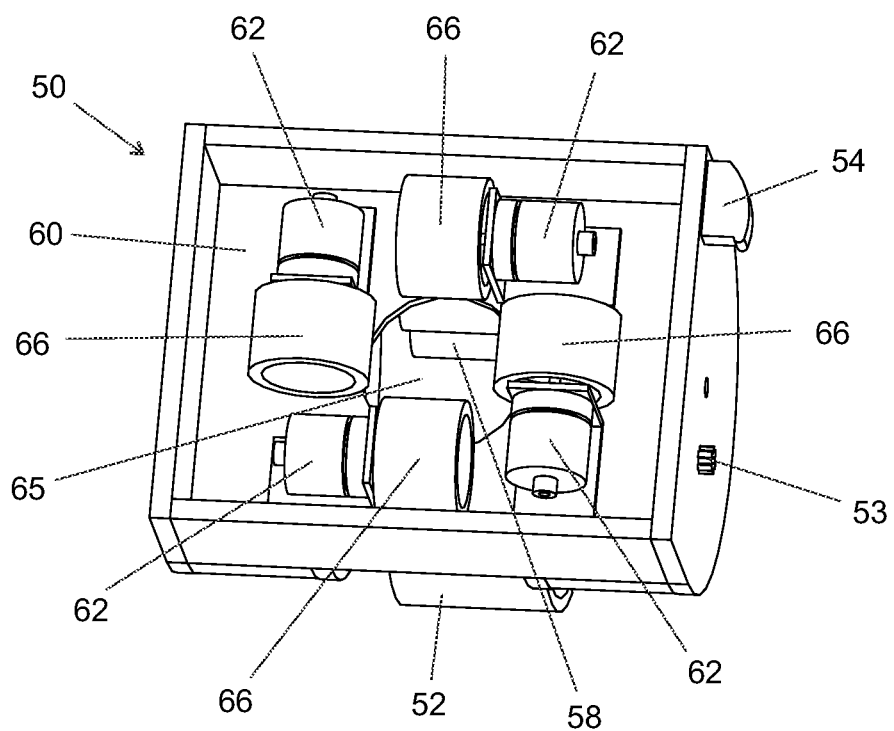
FIG. 8 is a front perspective view of one embodiment of the ball firing system, without its clear faceplate, and showing the motor ring.

Another aspect of the preferred embodiment that makes it smaller and lighter than previous systems and yet able to fire balls accurately is the ball firing system. As shown in FIG. 8, the primary component of the ball firing system is the ball firing head 50 and the primary component of the ball firing head is the motor ring 60.

The motor ring 60 differs from prior art in that it uses at least three ball firing motors 62 (in this preferred embodiment four ball firing motors are used), each of which directly drives a lightweight ball firing wheel 66. The ball firing motors and ball firing wheels are assembled into a ring forming an opening in the center that is slightly smaller than the diameter of the ball.

Note that the ball firing motors, unlike the motors in prior art, are not intended to be spinning all the time, but only spin up a fraction of a second before each game ball is fired. The current preferred embodiment has this possibility due to the fact that the motors directly drive small lightweight wheels and can spin up to full speed in a fraction of a second. This aspect of the preferred embodiment greatly extends the time that the battery system can operate before needing to be recharged.

Figure 9:
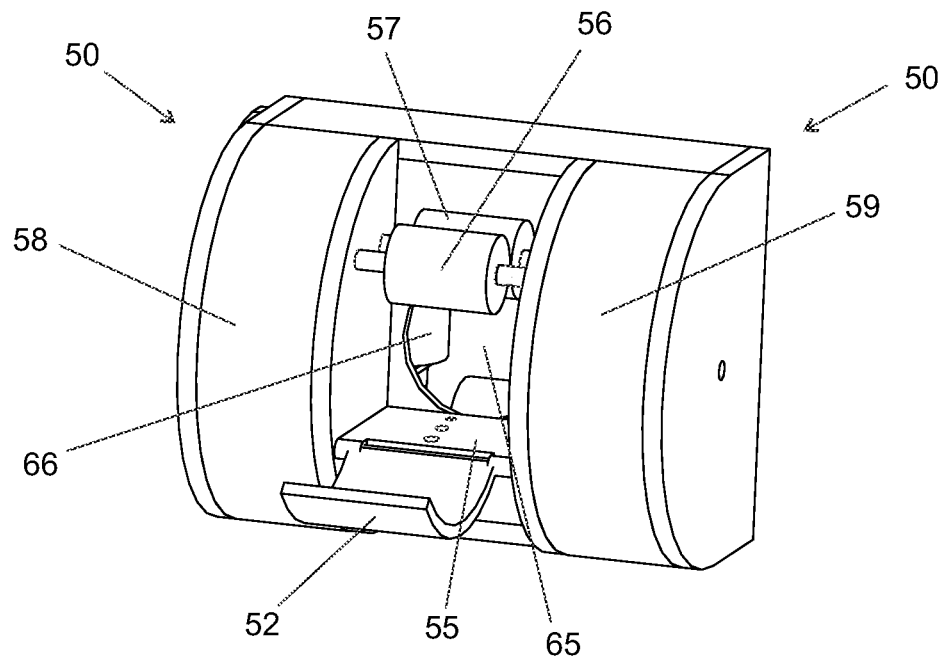
FIG. 9 is a rear perspective view of one embodiment of the ball firing system.
Figure 10:
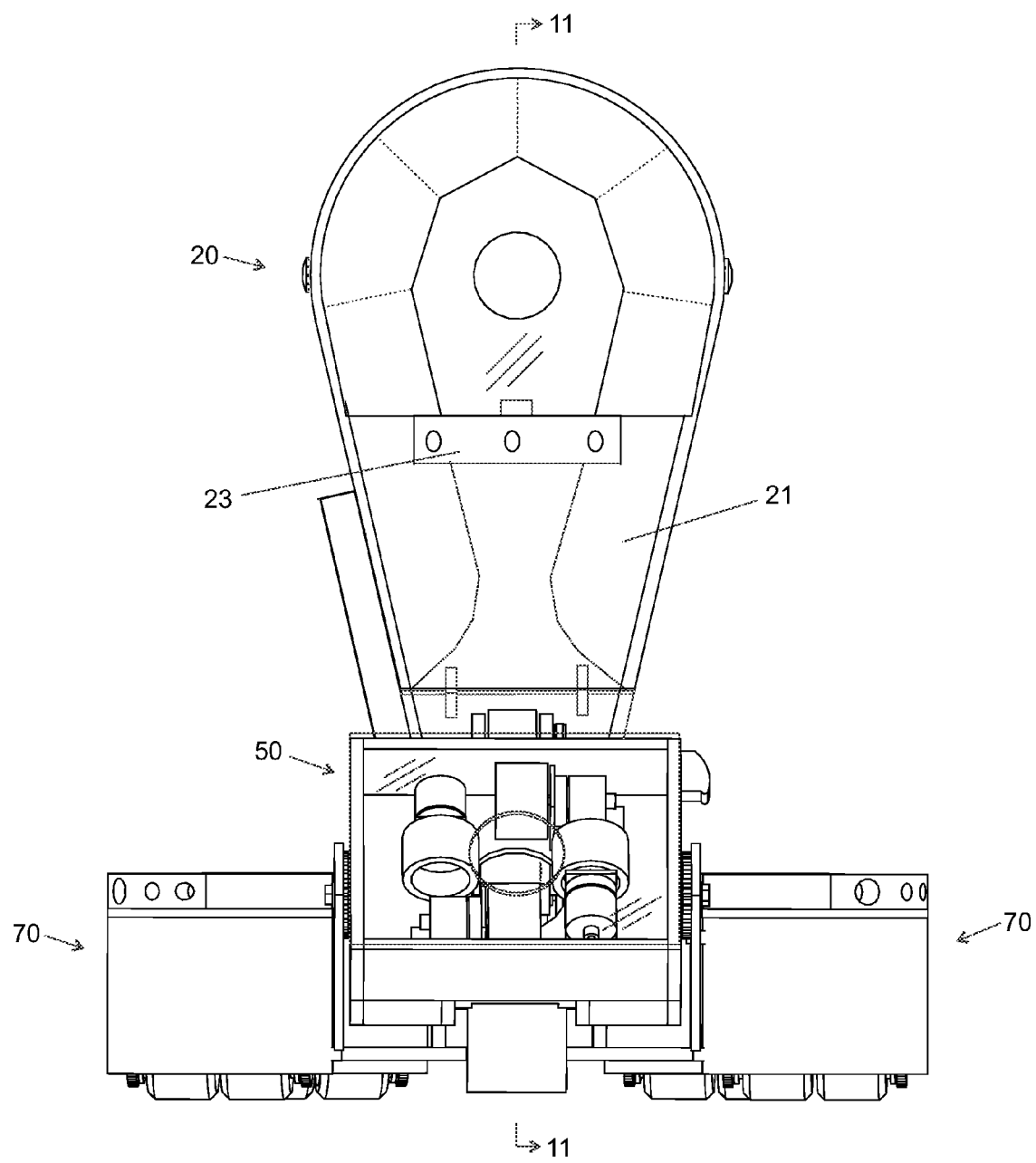
FIG. 10 is a front view of one embodiment of the present invention with the ball firing system with lines and arrows indicating the section plane that defines the section view in FIG. 11.

The ball firing motors 62 in the motor ring 60 are individually controlled by electronic speed controllers that are housed in the left and right firing head compartments 58 and 59 located on the back of the firing head as shown in FIG. 9. The ball firing service communicates with each firing motor's electronic speed controller to apply the correct spin and velocity to each game ball by varying the rotational speed of each ball firing motor. The ball firing service will control the ball firing motors to rotate at precise rates in order to apply a specific spin to each game ball—backspin, topspin, sidespin or anything in between. For instance, to apply top spin, the top motor is rotated at a higher rate than the bottom motor while both side motors rotate at a rate midway between the two.

Back spin is produced by changing the bottom motor to rotate at a higher rate than the top motor. By varying the rates of all four motors together, each individual game ball can be spun in any plane as required to create all of the different shots that the human opponent that is being simulated is capable of producing.

As shown in FIG. 1, the motor ring 60 is mounted inside the ball firing head 50 and the ball firing head has a transparent face plate 51. The transparent face plate, which in this embodiment is made of a clear high-impact acrylic, allows the player to instantly see if a game ball has been advanced to the ball firing guide 55 shown in FIG. 9 and is ready to be fired.

As shown in FIG. 1, the ball firing head is mounted to the platform by a tilt assembly 41 for manipulating the elevation angle of the head. As shown in FIG. 8, the ball firing head has a pinion gear 53 that protrudes from the right side of the head. This pinion gear is mounted on the drive shaft of a servo motor that is mounted inside the left firing head compartment 58. This pinion gear 53 meshes with the spur gear 43 shown in FIG. 4 that is mounted stationary on the tilt assembly 41 such that rotation of the servo motor will change the elevation of the firing head relative to the platform. The servo motor is then controlled by the ball firing service to elevate the firing head to any angle from 0 to 90 degrees relative to the plane of the playing court or field.

By controlling the speed of each of the firing motors, and by controlling the elevation of the firing head, the ball firing service has the capability of precisely controlling the spin and flight path of each individual game ball being fired.

The ball firing system includes a series of guides and rollers that move a game ball from the ball storage system and load it into the opening between the wheels in the motor ring. The loading process has 5 stages as shown in the section view in FIG. 11. The path of a game ball 18 from the ball storage device out through the motor ring is indicated by a dash-double-dot line ending in an arrow. This five stage loading process is essential to maintain the overall flow and timing of each game ball during the playing of a drill or game.

The five stages that each game ball passes through along this path are: staging, pre-loading, loading, aiming and firing. The five stages correspond to the five ball position sensors that make up the ball loading sensor system. The individual sensors that make up the ball loading sensor system are located on the guides that the game ball travels along as it moves from the ball storage device and into the ball firing head. The loading sensors in this preferred embodiment are force-sensing resistors, but there are other types of sensors that can be used in other embodiments. The ball firing service uses the feedback from the five ball position sensors to track the location of each game ball during the ball firing process.

Figure 11:
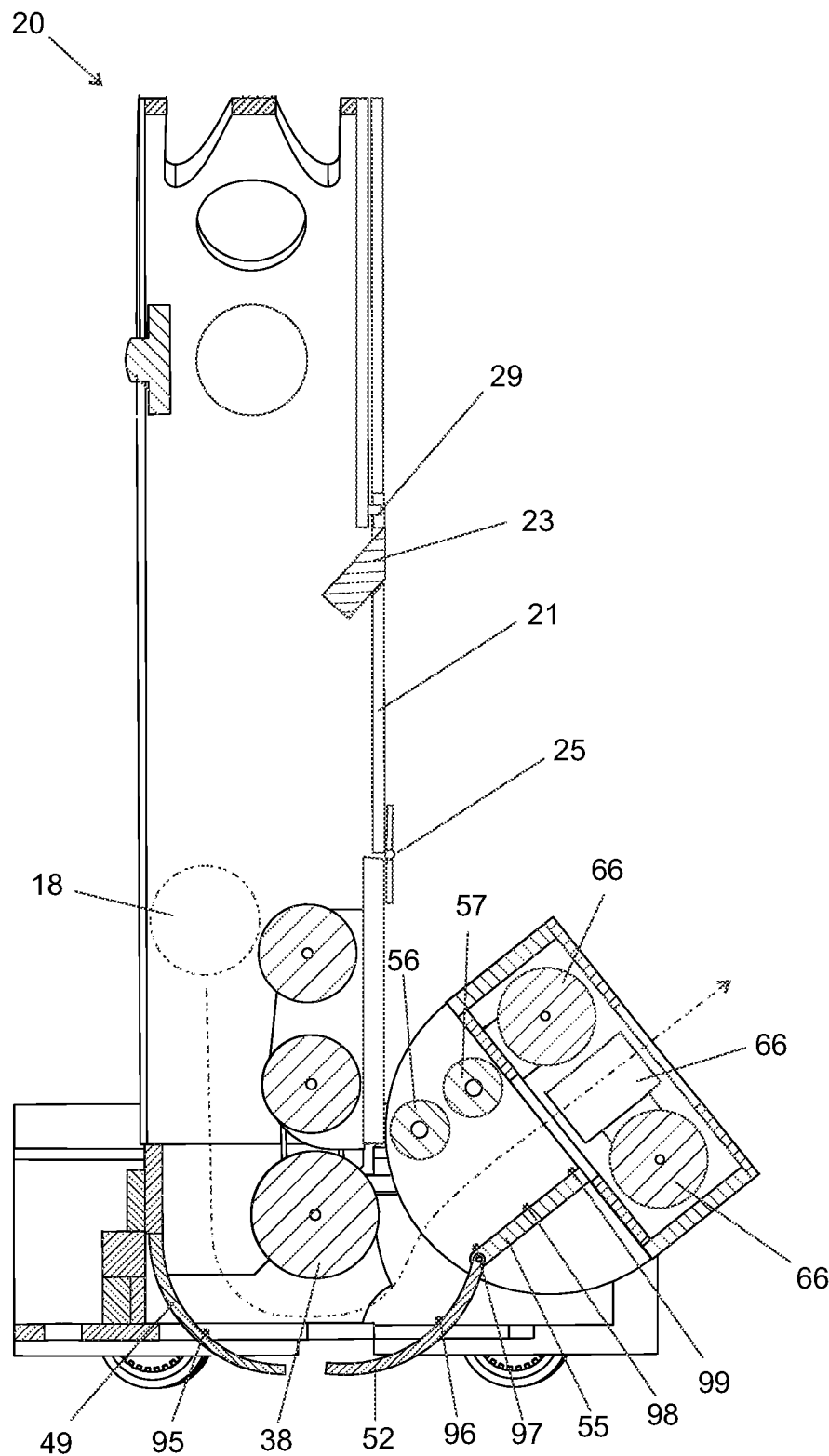
FIG. 11 is a section view of the embodiment of the present invention using the section plane shown in FIG. 10, and with a dash-double-dot line showing the ball loading and firing path.

As shown in FIG. 11, the movement of the game ball through the first three stages is determined by the sweeper wheel 38 which rolls the game ball along the rear and front ball guides from the staging stage to the pre-loading stage. The staging sensor 95 is located half way down on the rear loading guide 49. The pre-loading sensor 96 is located half way up the front loading guide 52. These front and rear loading guides have a radius that maintains a distance from the sweeper wheel that is slightly less than the diameter of a game ball. The remaining three sensors are all on the firing guide 55 located in the back of the firing head as shown in FIG. 11. FIG. 9 shows the firing guide 55 with the two loading rollers 56 and 57 mounted slightly less than a game ball's diameter directly above it. Both loading rollers 56 and 57 are driven by motors located in the left and right firing head compartments 58 and 59 respectively, and these motors are controlled by the ball firing service based on feedback from the ball loading sensor system.

The first of these three sensors, loading sensor 96, is located just as the sweeper wheel 38 pushes the game ball into the first loading roller 56. The game ball is then rolled by loading roller 56 onto the firing guide 55 in the firing head. In order for each game ball to load into the firing head correctly, the firing head has to be elevated to the loading position by the ball firing service. The ball firing head must return to this loading position each and every time a game ball is rolled from the front loading guide 52 and onto the firing guide 55 in the firing head. The first loading roller 56, after it grabs the game ball from the sweeper wheel, then rolls the game ball onto the aiming sensor 98. When the ball firing service detects that the game ball is positioned over the aiming sensor, the ball firing service directs the servo to elevate the firing head to the desired angle. At this point in the firing process, the drive system has moved the robot to the correct position on the court or field, and has oriented the platform 40, and the firing head 50 mounted on it, to point to the correct heading across the court, and the ball firing motors in the motor ring are spinning up to the correct firing speeds to produce the desired velocity and spin.

At the moment that the system arrives at the correct position, and the firing head is pointed at the correct heading and elevation, both loading rollers 56 and 57 are directed by the ball firing service to roll the game ball into the spinning firing motors and the game ball is fired across the court.

This process is then repeated over and over during the running of a drill or game such that each individual game ball, as directed by the ball firing service, is fired across the court from a unique position on the court, in a unique direction and with a unique spin in order to simulate a competition with an opponent that has a particular playing strategy, player physicality, playing style, and skill level.

As shown in FIG. 3, this preferred embodiment of the present invention uses a set of four omnidirectional drive units 70. These units allow the robot to maneuver in any direction around the court at a speed similar to a human opponent while firing each game ball across the court from different locations as they would be if be they were being hit by the corresponding human opponent that is being simulated.

Figure 14:
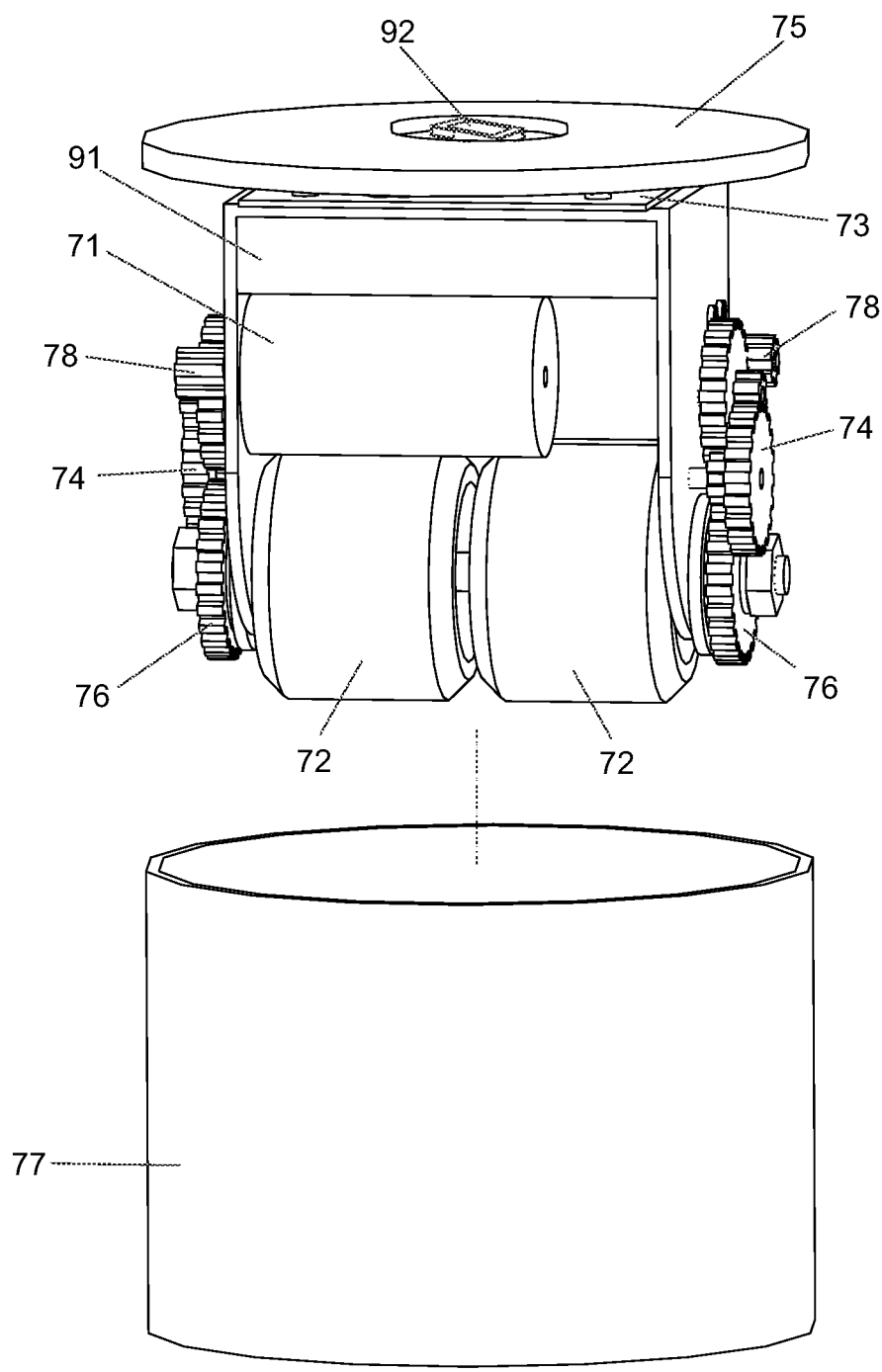
FIG. 14 is an exploded perspective view of one embodiment of a omnidirectional drive unit showing the drive unit assembly pulled out of the drive mounting cylinder.

As shown in FIG. 14, each of the four omnidirectional drive units 70 in this embodiment of the present invention is comprised of a differential drive assembly that has two drive motors 71. Each of these motors drives a pinion gear 78. This pinion gears meshes with a gear assembly 74, which in this embodiment of the differential drive assembly consists of a pair of combination gears. These combination gears in turn mesh with a spur gear that is part of a slip clutch assembly 76 that drives the axle connected to each drive wheel. This combination of pinion, combo gears and a slip clutch reduces the rotational rate of the motor to the optimal rotational rate required for accelerating the robot around the court or field with the speed and agility comparable to the corresponding human opponent that is being simulated.

As shown in FIG. 14, each of these drive wheel assemblies is mounted to a turntable 73 that allows them to self-rotate around the center point between the two wheels. The upper part of this turn table is mounted to a mounting disc 75 which is then attached to the top of the mounting cylinder 77. The mounting disc 75 has a hole in its center which allows the drive unit's electrical connector 92 to protrude out of the unit.

This connector connects to the batteries in the battery compartment 44 for power, and to the simulation service that is running on the computational system located in the service compartment 48.

Each differential drive assembly rotates freely around the center axis between the two wheels so that each drive unit can drive in any direction (omnidirectional). The drive controller compartment 91 in each differential drive assembly contains two electronic speed controllers, one for each drive motor, a drive system controller, and a set of drive sensors. The drive sensors, in this particular embodiment, include a micro-electro-mechanical magnetometer, accelerometer and gyroscope. The drive system controller will achieve a specified heading and acceleration by accelerating the two drive wheels at different speeds based on feedback from the drive sensors.

As shown in FIG. 3, this embodiment of the present invention has four omnidirectional drive units. Therefore this embodiment has a total of 8 electric motors driving a 8 drive wheels. Other embodiments might have a greater or smaller number of omnidirectional drive units.

Figure 12:
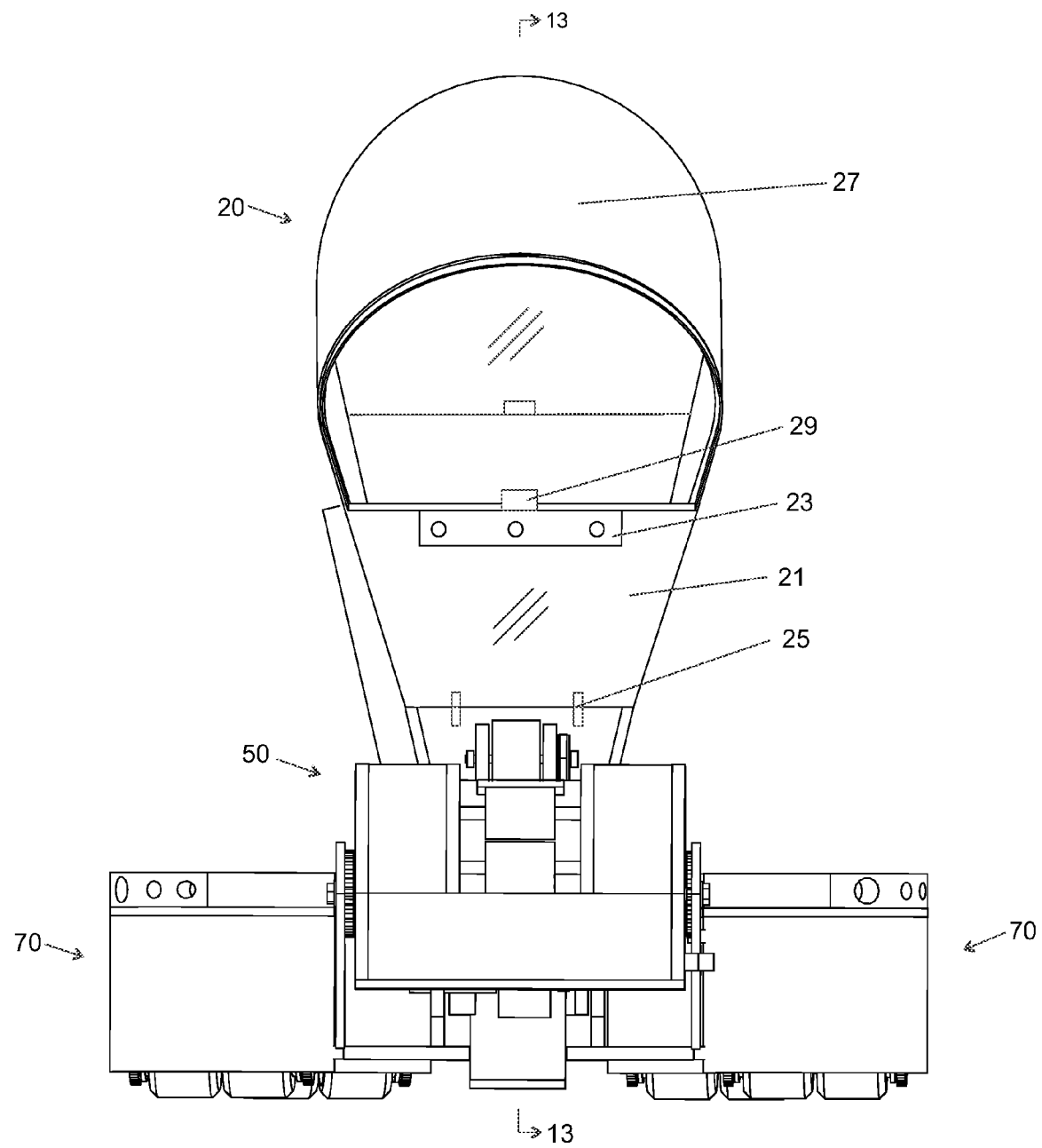
FIG. 12 is a front view of one embodiment of the present invention with the ball firing system in ball reloading mode, the ball catching apparatus in the deployed position, and lines and arrows indicating the section plane that defines the section view in FIG. 13.
Figure 13:
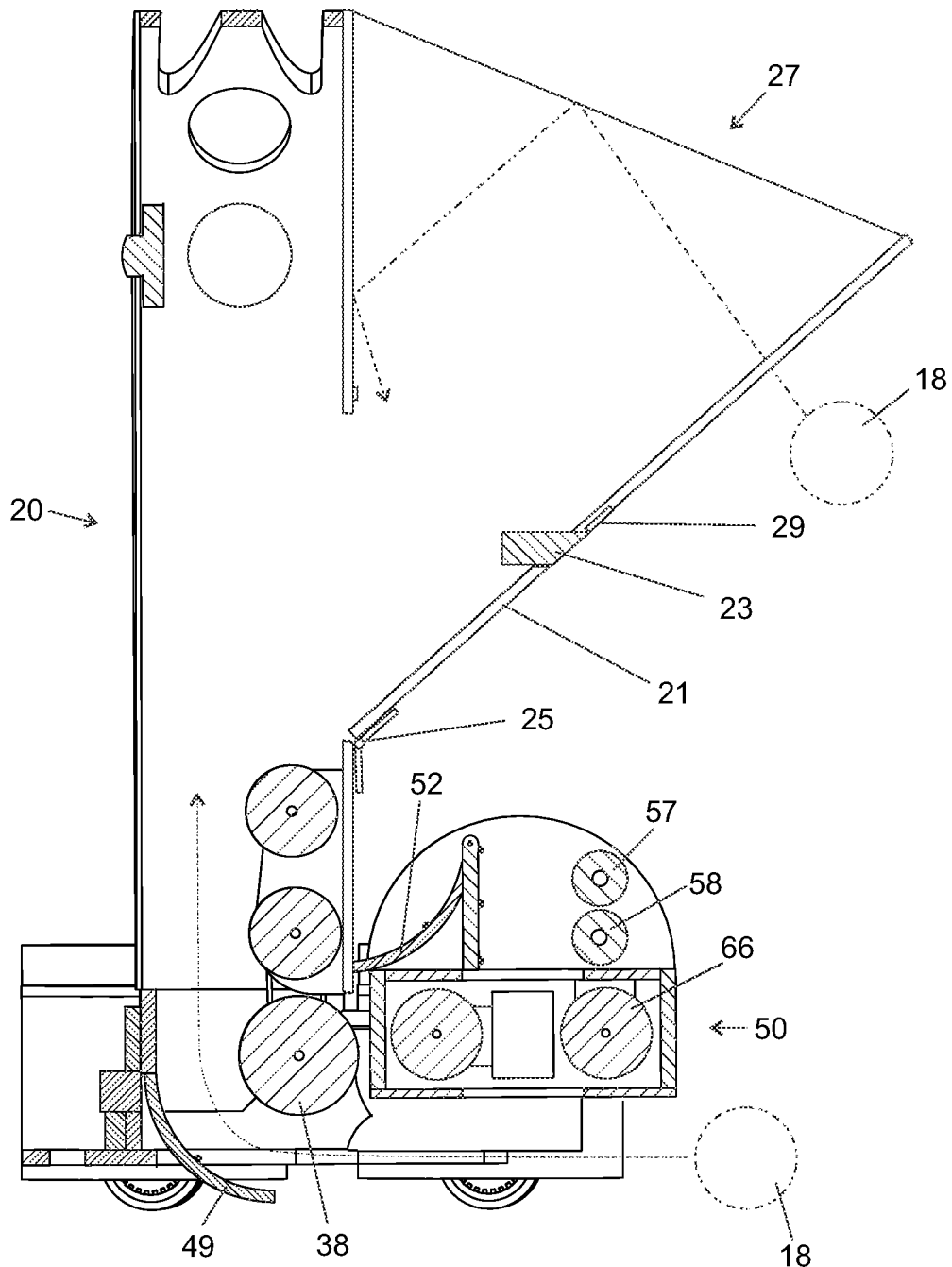
FIG. 13 is a section view of one embodiment of the present invention using the section plane indicated in FIG. 12 with the ball firing system in ball reloading mode, the ball catching apparatus in the deployed position, and with a dash-double-dot line showing the ball reloading path.

This preferred embodiment of the present invention has an autonomous reloading mode where the robot can drive over the game balls scattered around the court and reload them into the ball storage device without assistance from the player. During a training session, after all of the game balls have been fired across the court and the ball storage device has been emptied, the ball firing head rotates to face downwards towards the court as shown in FIGS. 12 and 13. At the same time, the forward ball guide 52 is drawn up and out of the way clearing the path for game balls to roll under the firing head as the robot drives forward over the game balls scattered around the court.

As shown in FIG. 4, the platform 40 is shaped so that it channels the game balls, that are coming in under the firing head, into the sweeper wheel 38 which then rolls the game balls up and onto the rear ball guide 49 and then up and into the ball storage device. The dash-double-dot line in FIG. 13 shows the path that a game ball follows during the autonomous reloading process.

Figure 16:
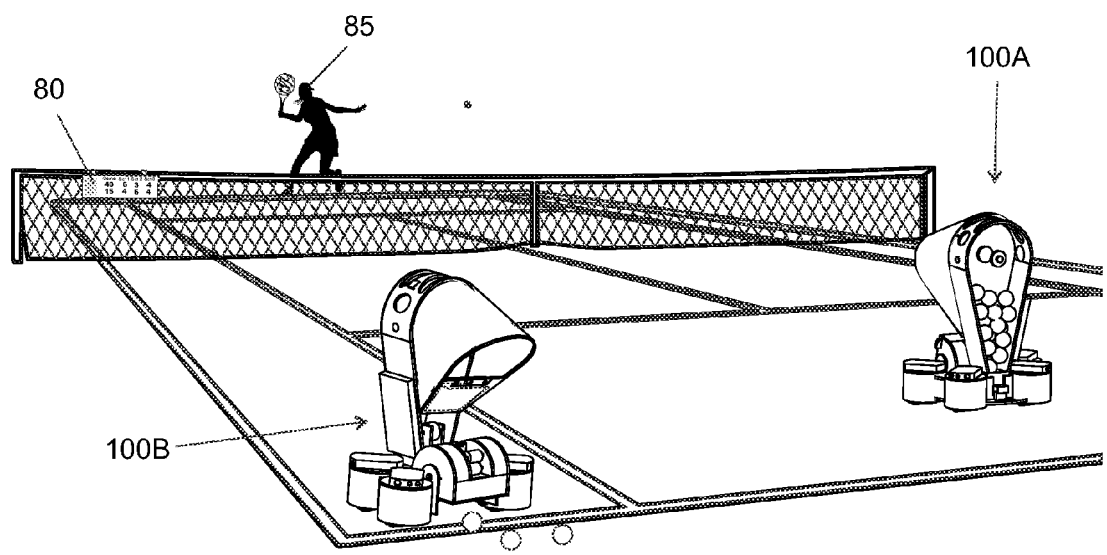
FIG. 16 is a perspective view of a tennis court that shows: a tennis player in the act of playing a simulated game or drill; the wireless interactive device hung over the net in the doubles alley; and two instances of the personal sports simulation robot—one in ball firing mode and the other in ball reloading mode, with the ball catching apparatus deployed on both.

Through the process of either the manual reloading of the game balls as shown in FIG. 7, or the autonomous reloading of the game balls as indicated by instance 100B in FIG. 16, the ball storage device allows a relatively small number of game balls to be continuously reused by the sports simulation robot in an efficient manner. Existing prior art either requires a large number of game balls and a large ball container, or it requires frequent refilling of the ball container using a ball gathering device that is not integrated into the sports training system.

This embodiment of the present invention uses a navigation sensor system to determine the robot's position, velocity, acceleration and orientation on the court at all times. The navigation sensor system makes the personal sports simulation robot both self-orienting and self-configuring.

Existing prior art requires that a sports training system be either permanently installed, or manually positioned and configured for each use. The preferred embodiment of the present invention only requires that the robot be placed on the court and turned on. The robot will then autonomously discover its position on the court, move to the correct position for beginning the training session, and then adjust itself to accurately fire game balls according to the game or drill that the player has indicated.

The navigation sensor system for this specific embodiment of the present invention uses multiple methods for verifying the exact location of the robot on the court. The three primary methods used are: line detection provided by line detection sensors built into the platform 40; data from navigation sensors 24 mounted on the ball storage device is analyzed to determine the relative size, angle and position of landmarks on the court including the top tape on the net and the center strap on the net; and data from four sonar range finders that are part of the sensor arrays 42 located on top of the four omnidirectional drive units 70, is used to confirm the robot's distance from any solid bodies including humans and animals that are in the proximity of the robot.

These three methods provide periodic position, velocity, acceleration and orientation measurements.

In between the times that these measurements are made, the system uses dead reckoning techniques based on accelerometer, digital compass and gyro data to continuously estimate its position, velocity, acceleration and orientation.

The prior art lacks the ability to sense the success or failure of the user to play a point or game, and does not have the ability to keep a game score, and existing prior art does not provide for a method for determining the success or failure of a player's performance during a simulated competition making it difficult for the player to judge their own progress.

This embodiment of the present invention uses the ball following sensor system to determine whether the game ball returned by the player has landed In or Out. Other or different combinations of sensors may be used for this purpose in other embodiments of the present invention.

If the system determines that the game ball landed In, then a new game ball is launched and the playing of the point continues. If the game ball is determined to have landed Out, then the simulation service plays a message through the player interactive system letting the player know that they have lost the point and what the current score is.

Figure 15:
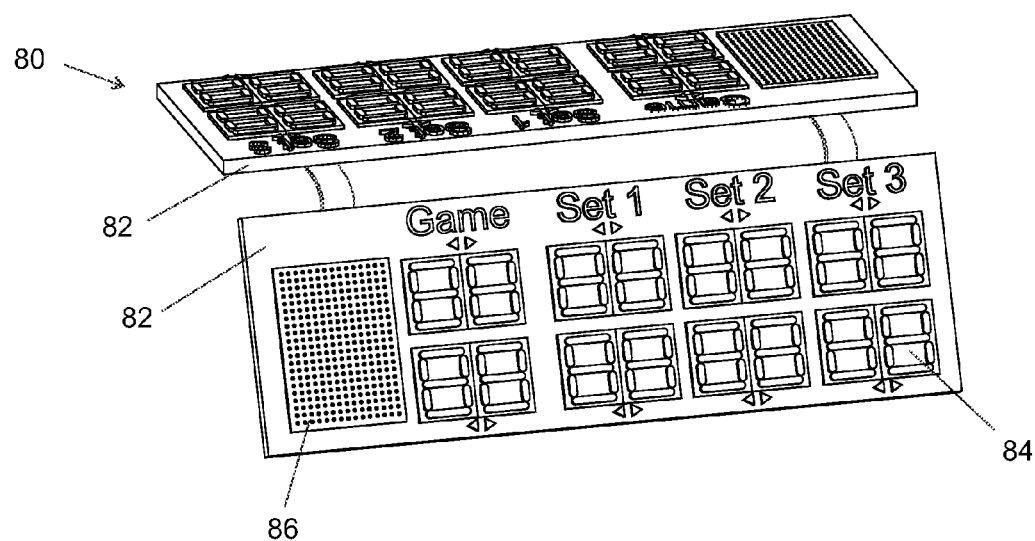
FIG. 15 is a front perspective view of one embodiment of the wireless interactive device.

As shown in FIG. 15, this preferred embodiment of the present invention incorporates a wireless interactive device 80. This preferred embodiment of the wireless interactive device uses multiple 7 segment LED units 84 to display the scoring data. The wireless interactive device 80 hangs over the net in the doubles lane area of the court as indicated in FIG. 16 to continuously display the score for each game and set during the course of each simulated game or drill. This embodiment of the wireless interactive device wirelessly subscribes to the score reporting service that is running on the computational system located in the service compartment 48 on the platform 40 by using a Bluetooth transceiver module built into the body of the display unit 82 paired with a Bluetooth transceiver module that is attached to the computational system.

The wireless interactive device also has a built in accelerometer that is monitored to detect when a game ball comes into contact with the net. This is used for detecting and indicating the occurrence of Let serves.

The wireless interactive device also incorporates a speaker and microphone that are located under the protective screen 86 as shown on FIG. 15. This speaker and microphone can be used in the event that the player is not using a wireless headset, allowing the player to talk directly to the wireless interactive device. The fact that the wireless interactive device is hung over the net places it relatively close to the player during the course of play, but the sound from the speaker, and the voice level that the player will have to use may annoy other players on adjacent courts. The Bluetooth transceiver connected to the computational system can also be paired directly with any standard Bluetooth device, including a standard Bluetooth wireless headset. The Bluetooth wireless headset may be the most useful way to communicate with the player interactive system particularly in a busy multi-court setting.

The player 85 indicated in FIG. 16 wears a wireless headset and speaks each command into the microphone on this headset which is interpreted by the player interactive system. In this way the player can navigate the system's voice menus to indicate: the playing characteristics of the opponent to be simulated; readiness to start or stop the playing of a point; corrections to the scoring system; or any other configuration element or setting. An infrared remote control may also be used in some embodiments.

This embodiment of the present invention also uses the player interactive system to provide coaching information to the player during the playing of each simulated point either through a wireless headset or through the wireless digital device. The coaching information comes from the coaching and progress reporting service and provides the player with information such as: the position on the court to which the player should move to play the next game ball; the grip to prepare for hitting the next game ball; the location on the court that the player should hit the next game ball to; the type of shot that that the player should use to play the next game ball; and the moment that the player should split step in preparation to return the next game ball.

This embodiment of the preferred embodiment, through the combination of all of the systems and services that it includes, has the ability to model individual playing styles and strategies, as well as the skill level of a simulated opponent.

The data on playing strategies, different physical player types, playing styles, and skill levels is well known by coaches and trainers in the field of sports training. In this embodiment of the present invention this data is maintained in a local database that is running on the computational system. The set of data in this local database is a sub-set of a much larger set of data that is regularly updated and processed in a cloud based machine learning system. The personal sports simulation robot both uploads and downloads data from the cloud based system each time the batteries are recharged in an area where a Wi-Fi network is available. The most recent datasets that have been downloaded into the local database are used to generate the activities that are carried out during the running of each simulation.

This embodiment of the present invention also maintains a local database of coaching information which, like the data used by the simulation service, is constantly refined in the cloud based system and then synchronized each time the personal sports simulation robot is charged in an area where a Wi-Fi network is available. This coaching information is then relayed to the player at appropriate times during the playing of each simulated point using the player interactive system. This coaching information includes, but is not limited to, the sequence of shots that form an effective strategy for defeating the strategy that is being used by the simulated opponent.

The coaching and progress reporting service also maintains a database record of the player's performance during each training session, and uses this data to create reports on the player's progress towards their long term sports training goals.

While the foregoing written description of the preferred embodiment enables one of ordinary skill to make and use what is considered presently to be the best mode thereof, those of ordinary skill will understand and appreciate the existence of variations, combinations, and equivalents of the specific embodiment, method, and examples herein. The preferred embodiment should therefore not be limited by the above described embodiment, method, and examples, but by all embodiments and methods within the scope and spirit of the preferred embodiment as claimed.

What is claimed is:

1. A sports simulation robot, comprising:
a platform for securing one or more robot components;
a battery system attached to the platform operable for powering one or more robot systems;
a computation system operable for running one or more robot services;
a ball storage device for storing a plurality of game balls, detachably mounted to the platform, and operable for retrieving and dispensing the game balls;
a ball firing system operable for loading and firing each game ball with a specific velocity and spin;
a tilt assembly that couples the ball firing system to the platform operable for tilting an elevation angle of the ball firing system;
a ball loading sensor system operable to generate signals representing a position of each game ball loaded into the ball firing system;
a ball firing service in communication with the ball firing system, the tilt assembly, and a simulation service, and responsive to the ball loading sensor system, and the simulation service, operable to control the dynamics with which each game ball is fired;
a player interactive system in communication with the simulation service operable for indicating a game or drill to be played, and the playing characteristics of an opponent to be simulated; and
wherein the simulation service in communication with the interactive system and the ball firing service and responsive to the interactive system and responsive to the ball firing service, and operable for controlling the simulation of a human opponent having the indicated playing characteristics during the simulation of the indicated game or drill.

2. The robot of claim 1, comprising a base that sits on a surface of the gaming court or field, having a pan assembly that couples the base to the platform that is operable for panning the azimuth angle of the platform in relation to the field or court.

3. The robot of claim 1, wherein the ball storage device comprises a bottom end with an opening smaller in diameter than the diameter of a game ball, a wheel mounted on one side of the opening powered by a motor that is connected to a battery by a switch that is operable to drive the wheel forward or backward, wherein the motor spins the wheel to compress a game ball against an opposite side of the ball storage device opening and rolling the game ball into or out of the ball storage device.

4. The robot of claim 1, wherein the ball firing system comprises three or more electric motors controlled individually by electronic speed controllers and with each of the electric motors directly driving a wheel, with each wheel arranged opposite each other in a ring and separated by a distance less than the diameter of a game ball, forming an opening through which the ball passes, wherein the wheels operating at individual speeds as controlled by the electronic speed controllers act together upon the game ball to provide a specific velocity and spin.

5. A sports simulation robot, comprising:
a platform for securing one or more robot components;
a battery system attached to the platform operable for powering one or more robot systems;
a computation system operable for running one or more robot services;
a navigation sensor system operable to generate signals representing the position, velocity, acceleration and azimuth angle of the robot in relation to a court or field;

a drive system attached to the platform operable for moving and orienting the robot on the field or court;
a ball storage device comprising a container containing a plurality of game balls, detachably mounted to the platform, operable for retrieving, storing and dispensing the game balls;
a ball firing system operable for firing each game ball with a specific velocity and spin;
a tilt assembly that couples the ball firing system to the platform and operable for setting the elevation angle of the ball firing system;
a ball loading sensor system operable to generate signals representing the position of each game ball being loaded into the ball firing system;
a ball firing service in communication with the tilt assembly, the ball firing system and a simulation service, and responsive to the ball loading sensor system and the simulation service to control the dynamics with which each game ball is fired;
a player interactive system in communication with the simulation service operable for indicating a game or drill to be played, and the playing characteristics of an opponent to be simulated;
wherein the simulation service in communication with the navigation service, a plurality of drive system services, the player interactive system and the ball firing service, and responsive to the player interactive system, and the ball firing service, and operable for controlling a simulation of a human opponent having the indicated playing characteristics during the simulation of the indicated game or drill.

6. The robot of claim 5, wherein the drive system comprises a plurality of omnidirectional drive units, and each omnidirectional drive unit further comprises:
a differential drive assembly that is rotatably mounted to the platform such that controlling each drive motor speed will rotate the differential drive assembly to a new azimuth angle in relation to the court or field;
a drive sensor system comprised of a plurality of sensors to generate signals representing a position, velocity, acceleration and azimuth angle of the differential drive assembly in relation to a court or field;
a drive system service in communication with the simulation service operable for sequentially controlling the force of acceleration that the differential drive assembly is applying to the platform and the azimuth angle in relation to the court or field that a force of acceleration is being directed towards.

7. The robot of claim 5, wherein the ball storage device comprises a bottom end with an opening smaller in diameter than the diameter of a game ball, with a sweeper wheel mounted on one side of the opening attached to the drive shaft of an electric motor that is connected to a battery by a switch that is operable to drive the sweeper wheel forward or in reverse, wherein the motor spins the sweeper wheel to compress a game ball against an opposite side of the ball storage device opening and rolling the game ball into or out of the ball storage device.

8. The robot of claim 5, wherein the ball firing system comprises at least three electric motors controlled individually by electronic speed controllers and with each of the electric motors directly driving a wheel, with each wheel arranged opposite each other in a ring and separated by a distance less than the diameter of a game ball, forming an opening into which the ball is loaded by the ball loading assembly, wherein the wheels operating at individual speeds as controlled by the electronic speed controllers act together upon the game ball to provide a specific velocity and spin.

9. The robot of claim 5, comprising a ball following sensor system comprises a plurality of ball following sensors, and a game ball following service in communication with and responsive to the ball following sensors operable to generate signals representing the flight path of each ball after being fired from the ball firing system and returned by a player, and operable to generate signals representing a location of the balls on a court or field after the game balls have come to rest on the court or field.

10. The robot of claim 5, wherein the simulation service comprises an autonomous reloading mode such that the simulation service is responsive to a ball following sensor system's signals for the location of the balls at rest on a court or field, and is operable for generating activities in communication with the drive system for controlling the robot to drive over the game ball on the court, drawing the game ball into a sweeper wheel rolling the game ball into the ball storage device.

11. The robot of claim 5, comprising a ball catching apparatus that is attached to the robot and operable for catching the game ball being returned by a player, and operable for retaining the game ball in the ball storage device.

12. The robot of claim 5, wherein the simulation service has a ball catching activity such that the simulation service is responsive to a ball following sensor system's signals for a flight path of each ball fired from a firing head and returned by a player, and is operable for generating a sequence of activities in communication with the drive system for controlling the drive system to drive to a position on a court or field such that the ball catching apparatus can catch the ball and return it into the ball storage device.

13. The robot of claim 5, comprising a line calling sensor system comprised of a plurality of line calling sensors, and a line calling service, in communication with and responsive to the line calling sensors, and operable to generate signals representing whether the ball returned by the player landed IN or OUT of a court or field.

14. The robot of claim 5, comprising a score reporting service that is responsive to the line calling service and operable to maintain a record of the game score and report to the player each time the score changes, and report to the player periodically or upon request, the aggregate score in the game or drill.

15. The robot of claim 5, comprising a coaching and progress reporting service that is responsive to the signals representing a score being reported by a score reporting system, and is operable to provide coaching information to a player during the playing of each game or drill, and operable to provide reports on the player's record over time in the games or drills against a plurality of simulated opponents.

16. The robot of claim 5, wherein the player interactive system further comprises a wireless interactive device that is wirelessly connected to the robot and operable for inputting commands to a simulation service, and for reporting system information from the simulation service, a score reporting service, and a coaching and progress reporting service.

* * * * *